(12) United States Patent
Dooley et al.

(10) Patent No.: US 12,606,643 B2
(45) Date of Patent: Apr. 21, 2026

(54) SYSTEMS AND TECHNIQUES FOR POLYMER DEGASSING

(71) Applicant: Chevron Phillips Chemical Company LP, The Woodlands, TX (US)

(72) Inventors: Kenneth A Dooley, Kingwood, TX (US); Jeffrey S. Lowell, Kingwood, TX (US); Joseph A. Curren, Kingwood, TX (US); Rebecca A Gonzales, The Woodlands, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 91 days.

(21) Appl. No.: 18/781,402

(22) Filed: Jul. 23, 2024

(65) Prior Publication Data

US 2024/0384010 A1     Nov. 21, 2024

Related U.S. Application Data

(63) Continuation of application No. 17/664,282, filed on May 20, 2022, now Pat. No. 12,098,221.

(51) Int. Cl.
| | |
|---|---|
| *C08F 2/01* | (2006.01) |
| *B01D 19/00* | (2006.01) |
| (Continued) | |

(52) U.S. Cl.
CPC ............ *C08F 2/01* (2013.01); *B01D 19/0005* (2013.01); *C08F 6/005* (2013.01); *C08F 10/02* (2013.01); *C08F 2400/02* (2013.01)

(58) Field of Classification Search
CPC ........ C08F 6/005; B01J 8/0055; B01J 8/0015; B01J 8/24
(Continued)

(56) References Cited

U.S. PATENT DOCUMENTS

| | | |
|---|---|---|
| 3,279,087 A | 10/1966 | Hearne |
| 4,499,263 A | 2/1985 | Messura |
| (Continued) | | |

FOREIGN PATENT DOCUMENTS

| | | |
|---|---|---|
| EP | 801081 A | 10/1997 |
| EP | 1414879 A1 | 5/2004 |
| (Continued) | | |

*Primary Examiner* — Fred M Teskin
(74) *Attorney, Agent, or Firm* — Eversheds Sutherland (US) LLP

(57) ABSTRACT

A purge system for a polymerization system may include a purge column including a stripping zone and a stripping fluid distributor below the stripping zone for injecting a stripping fluid including one or more light olefins. A first displacement zone is below the distributor. A second displacement zone is below the first displacement zone. A nitrogen distributor introduces nitrogen in the second displacement zone. Another purge system for a polymerization system may include a fluidized bed separator and a purge column. The fluidized bed separator includes a separator inlet, a stripping fluid inlet, a first stripped fluid outlet, and a separator outlet. The purge column includes a flake inlet, a stripping zone, a stripping fluid distributor below the stripping zone, a stripped flake outlet, and a second stripped fluid outlet for a second stripped fluid from the purge column.

20 Claims, 4 Drawing Sheets

(51) Int. Cl.
  C08F 6/00          (2006.01)
  C08F 10/02         (2006.01)
(58) Field of Classification Search
  USPC .................................................. 528/492, 498
  See application file for complete search history.

(56)                References Cited

U.S. PATENT DOCUMENTS

| | | | |
|---|---|---|---|
| 4,832,915 | A | 5/1989 | Messura |
| 5,376,742 | A | 12/1994 | Krause |
| 5,462,351 | A | 10/1995 | Royal |
| 6,045,661 | A | 4/2000 | Kreischer |
| 6,281,300 | B1 * | 8/2001 | Kendrick ................ B01J 8/382 |
| | | | 528/503 |
| 11,208,506 | B2 | 12/2021 | Tribo |
| 2012/0282133 | A1 | 11/2012 | Liu |
| 2015/0322178 | A1 | 11/2015 | Penzo |
| 2016/0347875 | A1 * | 12/2016 | Chamayou ............. C08F 6/005 |
| 2019/0351386 | A1 | 11/2019 | Dooley |
| 2020/0247919 | A1 | 8/2020 | Dooley |

FOREIGN PATENT DOCUMENTS

| | | | |
|---|---|---|---|
| EP | 2344548 | B1 | 12/2014 |
| EP | 2743279 | A1 | 4/2018 |
| WO | 2017078843 | A1 | 5/2017 |
| WO | 2019221982 | A1 | 11/2019 |
| WO | 2020159712 | A1 | 6/2020 |
| WO | 2023225453 | A1 | 11/2023 |

* cited by examiner

SYSTEMS AND TECHNIQUES FOR POLYMER DEGASSING

CROSS REFERENCE TO RELATED APPLICATIONS

This application is a continuation of U.S. patent application Ser. No. 17/664,282, filed May 20, 2022, which issued as U.S. Pat. No. 12,098,221, and which is hereby incorporated by reference in its entirety.

TECHNICAL FIELD

This disclosure relates to systems and techniques for polymer degassing, and in particular, to systems and techniques for degassing polymer flakes produced by a polymerization system.

BACKGROUND

Single- or multiple-reactor systems may be used to produce polymer resins, such as polyethylene. For example, polyethylene may be produced using loop slurry reactors or gas-phase reactors. In gas-phase reactors, residual gas may be present in a product stream collected from a polymerization system. For example, the product stream may include polymer flakes or powder with interstitial gas. The product stream may be degassed, for example, by passing nitrogen or a light olefin through the polymer product to remove and reduce the residual gas from the reactor.

A need remains for new and improved systems and processes for degassing polymer products to remove residual gas.

SUMMARY OF THE DISCLOSURE

This summary is provided to introduce various concepts in a simplified form that are further described below in the detailed description. This summary is not intended to identify required or essential features of the claimed subject matter nor is the summary intended to limit the scope of the claimed subject matter.

In aspects, the present disclosure describes a purge system for a polymerization system. The purge system includes a purge column including a flake inlet for introducing a reactor product stream in a stripping zone of the purge column. The reactor product stream includes polymer flakes and one or more heavy hydrocarbons. The purge system further includes a stripping fluid distributor in the purge column below the stripping zone for injecting a stripping fluid including one or more light olefins into the stripping zone and adapted to provide stripped polymer flakes. The purge system further includes a first displacement zone below the distributor and configured to at least partially displace a first portion of residual stripping fluid from the stripped polymer flakes received from the stripping zone. The purge system further includes a second displacement zone below the first displacement zone configured to substantially displace a second portion of residual stripping fluid from the stripped polymer flakes received from the first displacement zone. For example, after treatment in the second zone, no more than 10 ppmw, no more than 5 ppmw, no more than 2 ppmw, or no more than 0.5 ppmw of stripping fluid may be present in the stripped polymer flakes. The purge system further includes a nitrogen distributor for introducing nitrogen in the second displacement zone. The purge system further includes a stripped flake outlet, and a stripping fluid outlet.

In aspects, the present disclosure describes a polymerization system includes a polymerization reactor and the purge system.

In aspects, the present disclosure describes a technique of operating a polymerization system including a polymerization reactor coupled to the purge system. The technique includes contacting one or more olefin monomers and a catalyst in the presence of one or more heavy hydrocarbons in a polymerization reactor to form a reactor product including polymer flakes and residual heavy hydrocarbons. The technique further includes introducing the reactor product in the stripping zone of the purge system. The technique further includes stripping the one or more heavy hydrocarbons from the polymer flakes of the reactor product in the purge system by distributing a stripping fluid including one or more light olefins through the stripping zone to provide stripped polymer flakes. The technique further includes displacing residual stripping fluid from the stripped polymer flakes by introducing nitrogen in the first displacement zone and the second displacement zone.

In aspects, the present disclosure describes a purge system for a polymerization system, the purge system including a fluidized bed separator and a purge column. The fluidized bed separator includes a separator inlet for introducing a reactor product stream including polymer flakes and one or more heavy hydrocarbons into a fluidized bed. The fluidized bed separator further includes a stripping fluid inlet for introducing a first stripping fluid in the fluidized bed. The fluidized bed separator further includes a first stripped fluid outlet for a first stripped fluid from the fluidized bed. The fluidized bed separator further includes a separator outlet for discharging stripped polymer flakes. The purge column includes a flake inlet for receiving the stripped polymer flakes from the fluidized bed separator into a stripping zone of the purge column. The purge column further includes a stripping fluid distributor below the stripping zone for injecting a second stripping fluid including one or more light olefins into the stripping zone. The purge column further includes a stripped flake outlet, and a second stripped fluid outlet for a second stripped fluid from the purge column.

In aspects, the present disclosure describes a polymerization system including a polymerization reactor and the purge system including the fluidized bed reactor and the purge column coupled to the polymerization reactor.

In aspects, the present disclosure describes a technique of operating a polymerization system including a polymerization reactor coupled to the purge system including the fluidized bed reactor and the purge column coupled to the polymerization reactor. The technique includes contacting one or more olefin monomers and a catalyst in the presence of one or more heavy hydrocarbons in the polymerization reactor to form a reactor product including polymer flakes and residual heavy hydrocarbons. The technique further includes introducing the reactor product in the fluidized bed of the fluidized bed separator. The technique further includes stripping the one or more heavy hydrocarbons from the polymer flakes of the reactor product by contacting the polymer flakes with a stripping fluid including one or more light olefins in the fluidized bed of the fluidized bed separator to provide stripped polymer flakes. The technique further includes introducing the stripped polymer flakes from the fluidized bed separator to the purge column. The technique further includes stripping the one or more heavy hydrocarbons from the stripped polymer flakes of the reactor product in the purge column by distributing the stripping fluid through the stripping zone.

This summary and the following detailed description provide examples and are explanatory only of the disclosure. Accordingly, the foregoing summary and the following detailed description should not be considered to be restrictive. Additional features or variations thereof can be provided in addition to those set forth herein, such as for example, various feature combinations and sub-combinations of these described in the detailed description.

BRIEF DESCRIPTION OF THE DRAWINGS

The following figures form a part of the present disclosure and are included to further demonstrate certain aspects of the present invention. The invention may be better understood by reference to one or more of these figures in combination with the detailed description of the specific embodiments presented herein.

Figure 1:
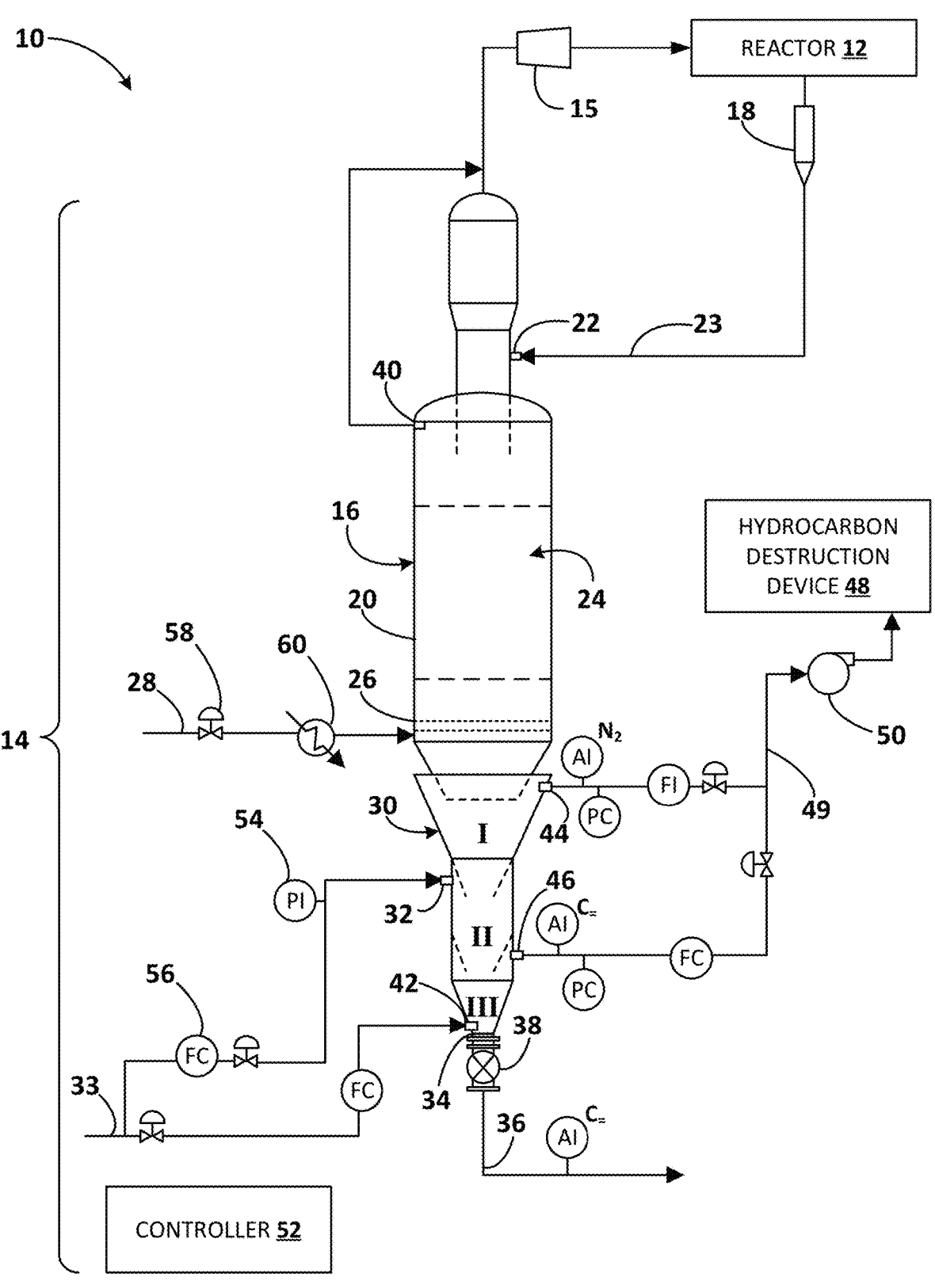
FIG. 1 is a conceptual diagram showing a polymerization system including a polymerization reactor fluidically coupled to a purge system including a purge column.

While the inventions disclosed herein are susceptible to various modifications and alternative forms, only a few specific aspects have been shown by way of example in the drawings and are described in detail below. The figures and detailed descriptions of these specific aspects are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

It is to be understood that the disclosure is not limited in its application to the details of construction and the arrangement of components set forth in the following description or illustrated in the drawings.

Definitions

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

While compositions and techniques are described in terms of "comprising" various components or steps, the compositions and techniques can also "consist essentially of" or "consist of" the various components or steps, unless stated otherwise.

The terms "a," "an," and "the" are intended to include plural alternatives, e.g., at least one. The terms "including", "with", and "having", as used herein, are defined as comprising (i.e., open language), unless specified otherwise.

Various numerical ranges are disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. For example, all numerical end points of ranges disclosed herein are approximate, unless excluded by proviso.

Values or ranges may be expressed herein as "about," for example, from "about" one particular value, and/or to "about" another particular value. When such values or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed therein, and that each value is also herein disclosed as "about" that particular value in addition to the value itself. In another aspect, use of the term "about" means±20% of the stated value, ±15% of the stated value, ±10% of the stated value, ±5% of the stated value, ±3% of the stated value, or ±1% of the stated value.

Applicant reserves the right to proviso out or exclude any individual members of any such group of values or ranges, including any sub-ranges or combinations of sub-ranges within the group, that can be claimed according to a range or in any similar manner, if for any reason Applicant chooses to claim less than the full measure of the disclosure, for example, to account for a reference that Applicant may be unaware of at the time of the filing of the application. Further, Applicant reserves the right to proviso out or exclude any individual substituents, analogs, compounds, ligands, structures, or groups thereof, or any members of a claimed group, if for any reason Applicant chooses to claim less than the full measure of the disclosure, for example, to account for a reference that Applicant may be unaware of at the time of the filing of the application.

For the purposes of this disclosure, "polymer flakes" when used in the context of products of a polymerization reactor refers to a powder, fluff, or flaky form of polymer typically produced by polymerization reactors.

For the purposes of this disclosure, "light olefin" refers to an olefin with two or three carbon atoms.

For the purposes of this disclosure, "heavy hydrocarbon" refers to a hydrocarbon with four or more carbon atoms.

Although any techniques and materials similar or equivalent to those described herein can be used in the practice or testing of the invention, the typical techniques and materials are herein described.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

The present disclosure generally relates to systems and techniques for polymer degassing, and in particular, to systems and techniques for degassing polymer flakes produced by a polymerization system. For example, the polymerization system may include a polymerization reactor configured to polymerize an olefin to produce polyolefin flakes, and a purge system to degas the polyolefin flakes to remove residual gas carried with the flakes from the polymerization reactor. The polymerization reactor may be a gas-phase olefin polymerization reactor, and the residual gas may include heavy hydrocarbons.

One of the challenges to increasing polyolefin production rates using gas-phase reactors arises from the capacity of conventional degassing systems. For example, a degassing system may use nitrogen to purge polymer flakes of heavy hydrocarbons from a reactor prior to sending the flakes to a finishing area to be pelletized and transported. The hydrocarbon-saturated nitrogen may be sent to a compressor/refrigeration system to clean up the nitrogen and recover the heavy hydrocarbons. As production rates are increased and/or lower density products are produced, the residence time in the degassing vessels and the amount of nitrogen being used to purge the polymer flake may limit the polymer production rate. In addition to these factors, conventional systems including multiple degassing vessels may foul in intra-vessel lines or components, for example, at rotary feeders located between degassing vessels. Such fouling may result in reduced production rates and reactor outages to clean the vanes of the rotary feeders.

Instead of, or in addition to, nitrogen, a light olefin may be used for degassing. For example, ethylene may be used as a stripping fluid for degassing flakes in one or more degassing vessels. The light olefin may then be recycled to the reactor as a monomer or comonomer for polymerization. However, in course of degassing, the light olefin itself may remain entrained to some extent in polymer flakes.

The loss of light olefin with the polymer product can be reduced by the systems and techniques according to the present disclosure. For example, a light olefin disengagement zone, a nitrogen displacement zone, and a final light olefin removal zone below the main distributor for injecting the light olefin stripping fluid can be used to reduce or minimize light olefin losses. Additionally, a controller and sensors can be used to monitor one or more of light olefin or nitrogen concentrations or pressure and flow profiles at one or more locations or across sections in the purge system to reduce or minimize light olefin losses.

It has been further discovered that all or at least a portion of the light olefin that is used as a stripping fluid does not require pre-treatment to remove catalyst poisons before using (for example, recycling) the light olefin for polymerization. For example, at least a portion of catalyst poison present in the light olefin may be reduced or removed by residual catalytic activity in the polymer flakes treated or degassed with the light olefin. Thus, the light olefin introduced or recycled to the reactor after being used as a stripping fluid may exhibit reduced or substantially no catalyst poison.

In aspects, the present disclosure describes a purge system for a polymerization system. The purge system includes a purge column including a flake inlet for introducing a reactor product stream in a stripping zone of the purge column. The reactor product stream includes polymer flakes and one or more heavy hydrocarbons. The purge system further includes a stripping fluid distributor in the purge column below the stripping zone for injecting a stripping fluid including one or more light olefins into the stripping zone and adapted to provide stripped polymer flakes. The purge system further includes a first displacement zone below the distributor and configured to at least partially displace a first portion of residual stripping fluid from the stripped polymer flakes received from the stripping zone. The purge system further includes a second displacement zone below the first displacement zone configured to substantially displace a second portion of residual stripping fluid from the stripped polymer flakes received from the first displacement zone. The purge system further includes a nitrogen distributor for introducing nitrogen in the second displacement zone. The purge system further includes a stripped flake outlet, and a stripping fluid outlet.

In aspects, the present disclosure describes a polymerization system includes a polymerization reactor and the purge system.

In aspects, the present disclosure describes a technique of operating a polymerization system including a polymerization reactor coupled to the purge system. The technique includes contacting one or more olefin monomers and a catalyst in the presence of one or more heavy hydrocarbons in a polymerization reactor to form a reactor product including polymer flakes and residual heavy hydrocarbons. The technique further includes introducing the reactor product in the stripping zone of the purge system. The technique further includes stripping the one or more heavy hydrocarbons from the polymer flakes of the reactor product in the purge system by distributing a stripping fluid including one or more light olefins through the stripping zone to provide stripped polymer flakes. The technique further includes displacing residual stripping fluid from the stripped polymer flakes by introducing nitrogen in the first displacement zone and the second displacement zone.

In some aspects, in addition to a purge column, a fluidized bed may be used to provide an initial flash for preliminary separation of gas and flakes from the reactor as well as to heat the flakes. The fluidized bed may also provide an elevation increase to reach the top of the purge column, which may be helpful in gas-phase processes where the bottom of the reactor is not significantly elevated.

In aspects, the present disclosure describes a purge system for a polymerization system, the purge system including a fluidized bed separator and a purge column. The fluidized bed separator includes a separator inlet for introducing a reactor product stream including polymer flakes and one or more heavy hydrocarbons into a fluidized bed. The fluidized bed separator further includes a stripping fluid inlet for introducing a first stripping fluid in the fluidized bed. The fluidized bed separator further includes a first stripped fluid outlet for a first stripped fluid from the fluidized bed. The fluidized bed separator further includes a separator outlet for discharging stripped polymer flakes. The purge column includes a flake inlet for receiving the stripped polymer flakes from the fluidized bed separator into a stripping zone of the purge column. The purge column further includes a stripping fluid distributor below the stripping zone for injecting a second stripping fluid including one or more light olefins into the stripping zone. The purge column further includes a stripped flake outlet, and a second stripped fluid outlet for a second stripped fluid from the purge column.

In aspects, the present disclosure describes a polymerization system including a polymerization reactor and the purge system including the fluidized bed reactor and the purge column coupled to the polymerization reactor.

In aspects, the present disclosure describes a technique of operating a polymerization system including a polymerization reactor coupled to the purge system including the fluidized bed reactor and the purge column coupled to the polymerization reactor. The technique includes contacting one or more olefin monomers and a catalyst in the presence of one or more heavy hydrocarbons in the polymerization reactor to form a reactor product including polymer flakes and residual heavy hydrocarbons. The technique further includes introducing the reactor product in the fluidized bed of the fluidized bed separator. The technique further includes stripping the one or more heavy hydrocarbons from the polymer flakes of the reactor product by contacting the polymer flakes with a stripping fluid including one or more light olefins in the fluidized bed of the fluidized bed separator to provide stripped polymer flakes. The technique further includes introducing the stripped polymer flakes from the fluidized bed separator to the purge column. The technique further includes stripping the one or more heavy hydrocarbons from the stripped polymer flakes of the reactor product in the purge column by distributing the stripping fluid through the stripping zone.

FIG. 1 is a conceptual diagram showing a polymerization system 10 including a polymerization reactor 12 fluidically coupled to a purge system 14 including a purge column 16.

The polymerization reactor polymerizes at least one monomer over a catalyst to produce a polymer product. The polymer product may be in the form of polymer powder or flakes. For example, the at least one monomer may include an olefin, and the polymer product may include a polyolefin. In aspects, the olefin is ethylene, and the polyolefin is polyethylene.

The polymerization reactor 12 may be any reactor suitable for producing the polymer product. Typically, polymerization reactor 12 is continuously operated to generate a continuous stream of polymer product. In some aspects the polymerization reactor 12 is a gas phase reactor. In some aspects, the polymerization reactor 12 is a fluidized bed gas phase reactor. In some aspects, the polymerization reactor 12 is a liquid phase reactor. In some aspects, the polymerization reactor 12 is a loop slurry reactor. While a single polymerization reactor 12 is shown in FIG. 1, in other aspects, polymerization reactor 12 may include more than one polymerization units.

The polymer product (such as polymer flakes) produced by the polymerization reactor 12 may carry residual gas from the reactor 12. For example, one or more heavy hydrocarbons may be entrained or carried from the reactor with the polymer products. Thus, a need may arise for reduction or removal of residual heavy hydrocarbons from the polymer product produced by the polymerization reactor 12.

In aspects, the purge system 14 is used to degas or strip the polymer product of residual gas or fluid, for example, fluid including heavy hydrocarbons. The purge system 14 may be coupled to an outlet of reactor 12. In aspects, polymerization system 10 includes a product withdrawal system 18 fluidically coupled to the outlet of reactor 12, and the outlet of the product withdrawal system 18 is ultimately coupled to the purge system 14. The product withdrawal system 18 may promote purification or densification of a polymer product stream generated by the polymerization reactor 12. The product withdrawal system may include any of the systems known to those skilled in the art suitable for transferring a reactor product stream to a degassing system (for example, cycling lock hopper systems, or continuous take-off systems).

In aspects, the purge system 14 includes a purge column 16. The purge column may include a housing 20, and a flake inlet 22 for introducing a reactor product stream in a product line 23 in a stripping zone 24 of the purge column 16. The housing 20 may be substantially cylindrical in a major portion of the purge column 16. The housing 20 may have a domed upper portion, and a conical or partially conical lower portion, as shown in FIG. 1. In some such aspects, the flake inlet 22 is at or adjacent a top of the purge column 16. The reactor product stream introduced via the product line 23 into the flake inlet 22 includes polymer flakes and one or more heavy hydrocarbons.

The purge system may further include a stripping fluid distributor 26 in the purge column 16 below the stripping zone 24 for injecting a stripping fluid into the stripping zone. The stripping fluid may include one or more light olefins and be adapted to provide stripped polymer flakes. The stripping fluid may be introduced from a stripping fluid line 28, for example, at or adjacent a bottom of the purge column 16. In aspects, the stripping fluid distributor 26 is at or adjacent a bottom of the purge column 16. For example, the stripping fluid distributor 26 may be above a conical bottom portion of the housing 20 of the purge column 16.

The stripping fluid distributor 26 may include one or more openings or nozzles, which may be generally directed upward, to direct the stripping fluid toward the stripping zone above the stripping fluid distributor 26. The stripping fluid distributor 26 may include one or more plates, grids, pipes, tubing, or conduits to distribute the stripping fluid. Further, the stripping fluid distributor 26 may be configured to permit polymer product such as powder or flakes to pass through, around, or about, the stripping fluid distributor 26. For example, the stripping fluid distributor 26 may define through-channels, -holes, or -openings. In some aspects, the stripping fluid distributor 26 may be disposed about or along a periphery of the purge column 16, being absent from a central region of the purge column. In other aspects, the stripping fluid distributor 26 may be disposed at or adjacent a center of the purge column 16, being absent from a peripheral region of the purge column 16.

The purge system 14 may further include a first displacement zone I below the stripping fluid distributor 26. The first displacement zone I is configured to at least partially displace a first portion of residual stripping fluid from the stripped polymer flakes received from the stripping zone 24. The first displacement zone I may function as an olefin displacement zone, for example, an ethylene displacement zone. Thus, residual light olefin used as or in the stripping fluid may be displaced from the stripped polymer flakes received in the first displacement zone I. In aspects, the first displacement zone I may displace ethylene while minimizing ethylene losses below the first displacement zone I, and reduce or minimize nitrogen volume to the displaced fluid from the first displacement zone I. Sufficient nitrogen may be introduced from below the first displacement zone to fully or nearly fully displace interstitial ethylene from the stripped polymer flakes as they move downward through the first displacement zone. The nitrogen may fully displace the ethylene with a low or minimal amount of nitrogen moving upwards into the first displacement zone I. The amount of nitrogen added may be slightly in excess of the rate of interstitial gas movement in a zone below the first displacement zone (for example, in a second displacement zone). The displaced fluid from the first displacement zone I may be removed using an appropriate motive device (for example, a compressor, fan, or blower) to control the pressure at the removal location to a target that minimizes nitrogen appearing in the displaced fluid expelled from the first displacement zone I.

In aspects, the first displacement zone I is defined by the purge column 16 itself, for example, being a lower portion or volume of the purge column 16. In aspects, the first displacement zone I is defined by a portion or volume of a displacement unit 30 coupled to the purge column 16. The displacement unit 30 may be permanently mechanically coupled to the purge column 16, for example, at or adjacent a bottom of the purge column 16. In other aspects, the displacement unit 30 is removably coupled to the purge column 16. In some aspects, the first displacement zone I is defined by an upper portion of the displacement unit 30. In some such aspects, the upper portion of the displacement unit 30 is a partial conical section, having a narrow end oriented downward.

The purge system 14 may further include a second displacement zone II below the first displacement zone I. The second displacement zone II is configured to substantially displace a second portion of residual stripping fluid from the stripped polymer flakes received from the first displacement zone I. The second displacement zone II may function as a nitrogen displacement zone, for example, receiving nitrogen that ultimately displaces light olefin or residual stripping fluid in the stripped polymer flakes received in the second displacement zone.

In aspects, the second displacement zone II is defined by the purge column 16 itself, for example, being a lower portion or volume of the purge column 16, for example, below the first displacement zone I. In other aspects, the second displacement zone II is defined by a portion or volume of the displacement unit 30. In some aspects, the second displacement zone I is defined by a portion of the displacement unit 30 below the first displacement zone II. In some such aspects, both first and second displacement zones I and II are defined by the displacement unit 30. In other aspects, first displacement zone I is defined by the purge column 16 and the second displacement zone II is defined by the displacement unit 30. In some aspects, the portion of the displacement unit 30 defining the second displacement zone II is a cylindrical section.

The purge system 14 may further include a nitrogen distributor 32 for introducing nitrogen in the second displacement zone II. The nitrogen distributor 32 may be an inlet or tubing coupled to a lower portion of the purge column 16 or to a portion of the displacement unit 30 defining the second displacement zone II. In some aspects, the nitrogen distributor 32 has a construction and geometry similar to that described with reference to the stripping fluid distributor 26. The nitrogen distributor 32 permits downward movement or passage of polymer product received from the first displacement zone I through the second displacement zone II. The nitrogen distributor 32 may receive nitrogen from a nitrogen line 33.

The purge system 14 further includes a stripped flake outlet 34 for dispensing degassed or stripped polymer flakes received from the purge column 16 and/or the displacement unit 30 as a product stream in a product line 36. In aspects, the stripped flake outlet 34 is coupled to a take-off valve 38 for extracting stripped polymer flakes from the purge column 16 (or ultimately from the purge system 14). The take-off valve 38 may operate continuously as polymerization and stripping of the polymer product proceeds. The take-off valve may be coupled at or adjacent a bottom of the purge column 16 (where all displacement zones are defined within the purge column 16) or at or adjacent a bottom of the displacement unit 30 (where at least one displacement zone is defined with the displacement unit 30).

While polymer product travels downward through the purge column 16, the stripping fluid travels upward through the purge column and collects heavy hydrocarbons from the polymer flakes to strip the polymer flakes of the heavy hydrocarbons. The purge system 14 includes a stripping fluid outlet 40 to release used stripping fluid from the purge column 16. In aspects, the stripping fluid outlet 40 is at or adjacent a top of the purge column 16. For example, the stripping fluid outlet 40 may be below a domed top of the housing 20 of the purge column 16. Because the stripping fluid includes olefins that may be used in polymerization, the stripping fluid along with the stripped heavy hydrocarbons may be recycled back to reactor 12 from the purge system 14 using an appropriate motive device 15, for example, a compressor. If liquids are formed in the compression steps, they can also be returned to the reactor using pumps.

The purge system 14 may include additional displacement zones. For example, the purge system 14 may further include a third displacement zone III below the second displacement zone II to substantially displace residual stripping fluid from the stripped polymer flakes received from the second displacement zone II. The third displacement zone III may function as a final olefin displacement zone, for example, reducing, partially removing, or substantially removing residual light olefin from the polymer flake received in the third displacement zone III. In some such aspects, distributor 32 is a first nitrogen distributor, and the purge system 14 further includes a second nitrogen distributor 42 for introducing nitrogen in the third displacement zone III. The second nitrogen distributor 42 may be similar to the first nitrogen distributor 32 described with reference to the second displacement zone II. In aspects, a relatively low flow of nitrogen is introduced in the third displacement zone III to reduce, remove, or substantially remove the final residual light olefin or stripping fluid from interstitial gas leaving the second displacement zone. For example, the displacement from the top of the third displacement zone III may be controlled by one or both of a flow controller or a pressure controller. The quantity of olefin (for example, ethylene) in fluid displaced from the third displacement zone III may be monitored and reduced or minimized by adjustments to the nitrogen rates to the first nitrogen distributor 32. The concentration and quantity of olefin in the interstitial gas accompanying the flakes discharged from the purge column 16 can also be monitored.

In some aspects, the first displacement zone I, the second displacement zone II, and the third displacement zone II are defined in a single displacement unit 30 coupled to a bottom of the purge column. In other aspects, the first displacement zone I, the second displacement zone II, and the third displacement zone III are defined in separate units, for example, in separate displacement units that are fluidically coupled to each other. In some aspects, the first displacement zone I, the second displacement zone II, and the third displacement zone II are defined in a portion of the purge column 16, for example, in successive lower portions of the purge column 16.

In aspects, the purge system 14 includes one or more outlets for expelling displaced fluid, for example, fluid including residual stripping fluid. In some such aspects, purge system 14 include one or both of a first displacement outlet 44 coupled to the first displacement zone I and a second displacement outlet 46 coupled to the second displacement zone II for expelling displaced fluid from the first displacement zone I and the second displacement zone II.

The displaced fluid may be collected from the first displacement zone I and the second displacement zone II and transported in displaced fluid line 49.

The displaced fluid including residual stripping fluid from the first displacement zone I and/or the second displacement zone II may be destroyed, for example, by treatment in a hydrocarbon destruction device 48. The hydrocarbon destruction device 48 may be configured to incinerate or otherwise destroy hydrocarbons, such as heavy hydrocarbons and/or residual light olefin displaced from the first displacement zone I or the second displacement zone II. The hydrocarbon destruction device 48 may include a flare. In aspects, the purge system 14 includes a motive device 50 (for example, compressor, blower, or fan) for transporting the displaced fluid to the hydrocarbon destruction device 48. Alternatively, the displaced fluid could be recovered using an appropriate separation device known to those skilled in the art, for example, a pressure swing absorption unit or a membrane separation unit.

The polymerization system 10 may include a controller 52 for controlling one or both of the polymerization reactor 12 or the purge system 14. The controller 52 may be electronically coupled to one or more control elements in polymerization system 10. For example, the purge system 14 may further include one or more of an olefin sensor, a nitrogen sensor, a flow sensor, or a pressure sensor at one or more predetermined locations of the purge system 14. In aspects, the controller 52 may send or receive signals to or from at least one sensor 54 (also known as indicators), at least one control element 56, at least one valve 58, and at least one heater 60. The controller 52 may also send or receive signals to or from the reactor 12. The controller 52 may ultimately control one or both of the reactor 12 or the purge system 14, for example, by using sensors to sense process conditions at one or more locations, and actuating control elements to influence process conditions at one or more locations.

The at least one sensor 54 may include one, two, or more sensors for sensing one or more parameters or process conditions. For example, the at least one sensor 54 may include one or more of a pressure indicator ("PI"), a flow indicator ("FI"), an analysis indicator ("AI") or a temperature indicator. The analysis indicator may include indicators for particular species, such as a nitrogen analysis indicator (marked as "N$_2$" in FIG. 1), or an olefin indicator (marked as "C$_=$") in FIG. 1. In aspects, the olefin indicator includes an ethylene indicator. The at least one control element 56 may include one or more of a pressure controller ("PC") or a flow controller ("FC").

One or more lines, such as inputs or outputs of purge system 14, may include one or more sensors or control elements, which may be present inline, or as a separate unit coupled to a line. For example, the stripping fluid line 33 may include one or both of a valve 58 or a heater 60. The nitrogen line 33 may include one or more of a sensor 54 (for example, a pressure indicator), a control element 56 (for example, a flow controller), and a valve in a first branch coupled to the second displacement zone II. The nitrogen line 33 may include one or both of a control element 56 (for example, a flow controller) and a valve in a second branch coupled to the third displacement zone III. The product line 36 may include a sensor (for example, an analysis indicator). The analysis indicator of product line 36 may include an olefin indicator, for example, an ethylene indicator. The displaced fluid line 49 may include one or more of an analysis indicator (for example, a nitrogen indicator), a pressure controller, a flow indicator, and a valve, in a first branch collecting displaced fluid from the first displacement zone I, or in a second branch collecting displaced fluid from the second displacement zone II.

Purge system 14 may be used to strip heavy hydrocarbons from the reactor product from the reactor 12, while reducing, minimizing, or substantially preventing loss of stripping fluid or stripping light olefin. In aspects, the purge system 14 may be operated using techniques described with reference to FIG. 2. However, any suitable technique according to the present disclosure may be used to operate the purge system 14.

Figure 2:
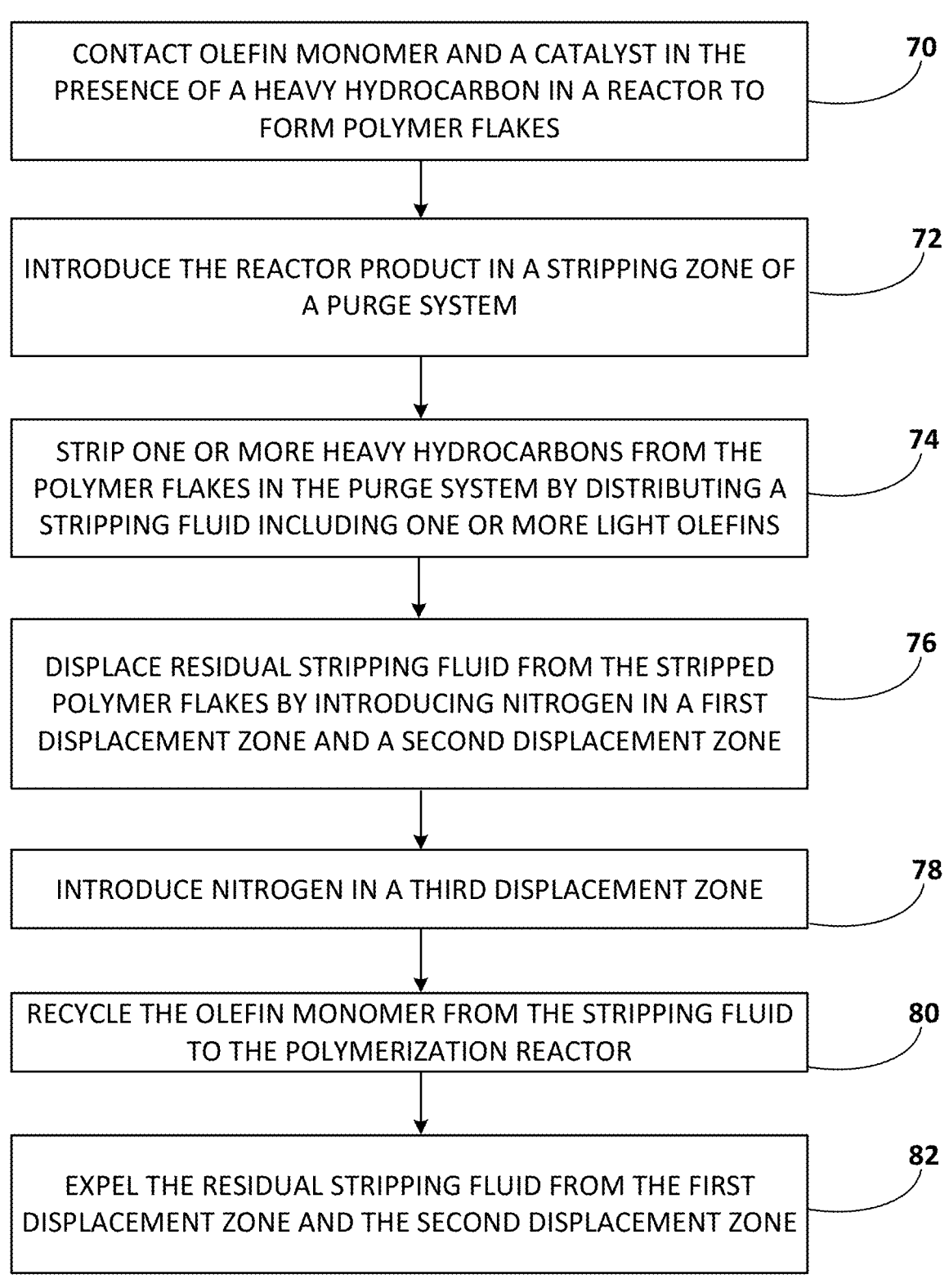
FIG. 2 is a flow diagram showing a technique for operating a polymerization system including a polymerization reactor fluidically coupled to a purge system including a purge column.

FIG. 2 is a flow diagram showing a technique for operating the polymerization system 10 including the polymerization reactor 12 fluidically coupled to the purge system 14 including the purge column 16. The technique of FIG. 2 is described with reference to the polymerization system 10 of FIG. 1 as an example, and can be alternatively practiced with another suitable system according to the present disclosure. At step 70, the technique includes contacting one or more olefin monomers and a catalyst in the presence of one or more heavy hydrocarbons in the polymerization reactor 12 to form a reactor product including polymer flakes and residual heavy hydrocarbons. The one or more heavy hydrocarbons may include one or more of 1-butene, 1-hexene, 1-octene, 1-decene, butanes, or pentanes. The catalyst may include a Ziegler-Natta catalyst, a chromium based catalyst, or a metallocene catalyst.

At step 72, the technique includes introducing the reactor product in the stripping zone 24 of the purge system 14. At step 74, the technique includes stripping the one or more heavy hydrocarbons from the polymer flakes of the reactor product in the purge system 14 by distributing a stripping fluid including one or more light olefins through the stripping zone 24 to provide stripped polymer flakes.

In aspects, the one or more olefin monomers used in the polymerization reaction include the one or more light olefins used for stripping the reactor product. For example, after being used for stripping, the one or more light olefins may be recycled to the reactor as olefin monomers for polymerization. In some such aspects, the one or more olefin monomers consist of or consist essentially of the one or more light olefins. In aspects, the stripping fluid consists of or consists essentially of ethylene. For example, the one or more olefin monomers and the one or more light olefins may consist of or consist essentially of ethylene. Thus, the technique may include, at step 80, optionally further recycling the one or more olefin monomers from the stripping fluid in the stripping zone 24 to the polymerization reactor 12.

At step 76, the technique further includes displacing residual stripping fluid from the stripped polymer flakes by introducing nitrogen in the first displacement zone I and the second displacement zone II. In some aspects, the displacing of residual stripping fluid from the stripped polymer flakes (76) includes introducing nitrogen in the first nitrogen inlet in the second displacement zone.

At step 78, the technique optionally further includes introducing nitrogen in the third displacement zone III. In some aspects, the displacing of residual stripping fluid from the stripped polymer flakes includes introducing nitrogen in the second nitrogen inlet in the third displacement zone III.

Step 80 may be performed before, during, or after one or both of steps 76 or 78.

The residual stripping fluid carried in polymer flakes descending below the stripping zone 24 may be reduced or removed from the purge system 14. For example, at step 82, the technique further includes expelling the residual stripping fluid in the first displacement zone I and the second displacement zone II from the polymerization system 14. In aspects, the stripped polymer flakes in the first displacement zone I include less than 25 ppmw of the heavy hydrocarbons. In aspects, the stripped polymer flakes in one or more of the first displacement zone I, the second displacement zone II, or the third displacement zone III include less than 5 ppmw of the stripping fluid. In aspects, the stripped polymer flakes in the third displacement zone include less than 2 ppmw of the stripping fluid.

In aspects, the light olefin (for example, ethylene) used for stripping is not pre-treated for catalyst poisons. In some such aspects, catalyst poisons present in the light olefin are at least partially deactivated by contact with residual catalyst present in the polymer flakes in the purge system 14. For example, a catalyst kill agent does not need to be added to the product stream received via product line 23 in the purge system 14 from the reactor 12. In these cases, the amount of untreated olefin (for example, ethylene) to be used could be controlled by monitoring polymer flake temperatures in the purge column 20 and increasing the amount of untreated ethylene sent to the stripping zone to lower the temperatures if they are increasing excessively. In systems where the residual catalyst activity in polymer flakes received from the reactor 12 is sufficient, the entire fresh ethylene feed stream to the reactor can be contacted with the residual active catalysts in the stripping zone 24 with the flakes, providing adequate poison removal. Thus, in some aspects, treatment beds for removing poisons from incoming olefin (for example, ethylene) or recycled hydrocarbons can be eliminated. For example, the use of active polymer for removing poisons from some or all of the fresh light olefin (stripping fluid) feed reduces, minimizes, or eliminates the need for treatment beds for the light olefin.

Thus, polymerization systems according to the disclosure, including a polymerization reactor coupled to a purge system including a purge column, can be used to reduce or minimize stripping fluid loss. The present disclosure also provides the use of a fluidized bed separator in combination with a purge column, as described with reference to FIGS. 3 and 4.

Figure 3:
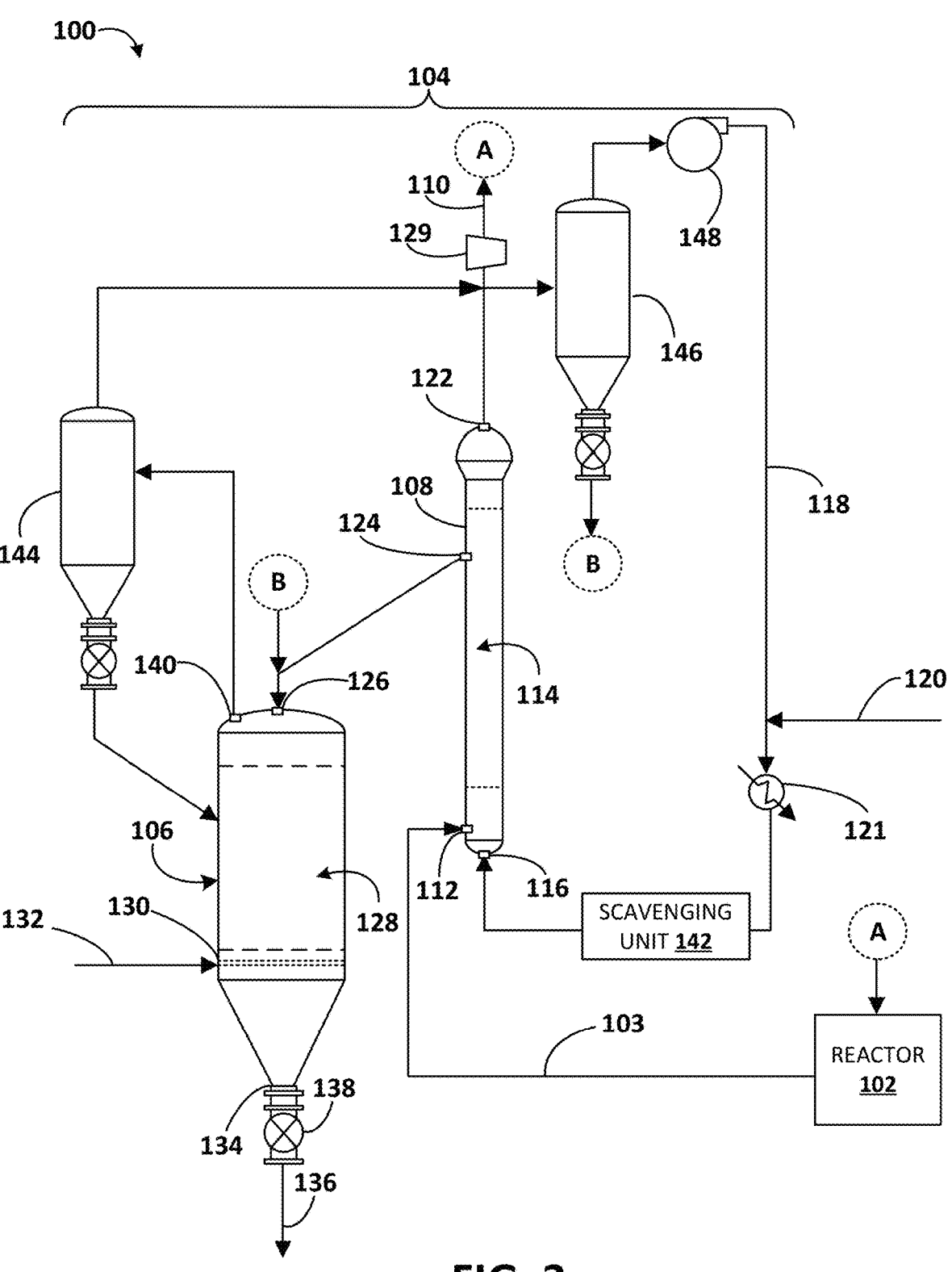
FIG. 3 is a conceptual diagram showing a polymerization system including a polymerization reactor fluidically coupled to a purge system including a purge column and a fluidized bed separator.

FIG. 3 is a conceptual diagram showing a polymerization system 100 including a polymerization reactor 102 fluidically coupled to a purge system 104 including a purge column 106 and a fluidized bed separator 108. The configuration and operation of the polymerization reactor 102 may be substantially similar to the polymerization reactor 12 described with reference to FIGS. 1 and 2. The polymerization reactor 102 may produce a polymer product stream transported through a product line 103 to the purge system 104. The purge system 104 may include a recycle line 110 for recycling stripped fluid from the purge system 104 to the polymerization reactor 102.

The fluidized bed separator 108 may be substantially cylindrical, and have one or two domed ends. In aspects, the fluidized bed separator 108 is formed from a relatively large diameter pipe. In aspects, the fluidized bed separator 108 includes a separator inlet 112 for introducing a reactor product stream including polymer flakes and one or more heavy hydrocarbons into a fluidized bed 114 in fluidized bed separator 108. The fluidized bed separator 108 may further include a stripping fluid inlet 116 for introducing a first stripping fluid in the fluidized bed 114. The first stripping fluid may be introduced via one or both of a stripping fluid recycle line 118 or a fresh stripping fluid line 120. The first stripping fluid may be heated. In some aspects, the purge system 104 includes a heater 121 for heating stripping fluid introduced in the fluidized bed separator 108. In some aspects, the heater 121 may be present along the recycle line 118 or the fresh stripping fluid line 120. In some aspects, multiple heaters may be provided along a same stripping fluid supply or recycle line, or along different stripping fluid supply or recycle lines.

The fluidized bed separator 108 may further include a first stripped fluid outlet 122 for a first stripped fluid discharged from the fluidized bed 114. For example, stripping fluid introduced through the stripping fluid inlet 116 may pass through the fluidized bed 114 and strip the polymer flakes present in the fluidized bed 114, and exit the fluidized bed 114 as a stripped fluid through the stripped fluid outlet 122. The fluidized bed separator 108 may further include a separator outlet 124 for discharging stripped polymer flakes, for example, from the fluidized bed 114. In aspects, the separator inlet 112 and the stripping fluid inlet 116 may be present at or adjacent a bottom of the fluidized bed separator 108. In some such aspects, the stripping fluid inlet 116 is at a bottom of the fluidized bed separator 108, and the separator inlet 112 is adjacent the bottom and above the stripping fluid inlet 116. In aspects, the stripped fluid outlet 122 and the separator outlet 124 may be present at or adjacent a top of the fluidized bed separator 108. For example, the stripped fluid outlet 122 may be at a top of the fluidized bed separator 108, and the separator outlet 124 adjacent the top and below the stripped fluid outlet. Thus, in some aspects, the polymer flakes and stripping fluid both may rise and pass through the fluidized bed 114, so that the stripping fluid can strip the polymer flakes in the fluidized bed 114.

In aspects, the fluidized bed separator 108 may include an expanded section at the top, for example, above one or both of the fluidized bed 114 and the separator outlet 124 for discharging stripped polymer flakes. The expanded section may reduce the amount of fines carried out with the gas leaving the top of the fluidized bed separator 108.

The purge column 106 may be generally similar to the purge column 16 described with reference to FIGS. 1 and 2. In aspects, the purge column 106 includes a flake inlet 126 for receiving the stripped polymer flakes from the fluidized bed separator 108 into a stripping zone 128 of the purge column 106. The purge column may include a stripping fluid distributor 130 below the stripping zone 128 for injecting a second stripping fluid including one or more light olefins into the stripping zone. In some aspects, the stripping fluid distributor 130 is adjacent a bottom of the purge column 106. For example, the stripping fluid distributor 130 may be present above a conical bottom portion of the purge column 106.

In aspects, the system 100 may include a motive device 129 (for example, a compressor), for transporting fluid from the fluidized bed separator 114 or from another component to the reactor 102.

The second stripping fluid may be transported to the stripping fluid distributor via second fresh stripping fluid line 132. The purge column 106 may further include a stripped flake outlet 134. The stripped flake outlet 134 may dispense degassed or stripped polymer flakes received from the purge column 106 as a product stream in a product line 136. In aspects, the stripped flake outlet 134 is coupled to a take-off valve 138 for extracting stripped polymer flakes from the purge column 106 (or ultimately from the purge system 104).

The purge column includes a second stripped fluid outlet 140 for a second stripped fluid from the purge column 106. Thus, polymer flakes may descend through the stripping zone 128 in the purge column 106, while stripping fluid rises through the stripping zone 128 to strip the polymer flakes of heavy hydrocarbons. In aspects, the flake inlet 126 is adjacent or at a top of the purge column.

In some aspects, the fluidized bed separator 108 may be partly or completely positioned above the purge column 106. For example, at least a portion of the fluidized bed separator 108 may be above a top of the purge column 106. In some aspects, the separator outlet 124 of the fluidized bed separator 108 is above a top of the purge column 106. In some aspects, the separator outlet 124 of the fluidized bed separator 108 is above the separator inlet 126 of the fluidized bed separator 106. Such a configuration may promote the flow or transport of polymer flakes that exit the fluidized bed separator 108 for further treatment in the purge column 106. Thus, the purge column 106 and the fluidized bed separator 108 may perform successive or serial stripping of the polymer flakes.

In some aspects, the purge system 104 further includes adjunct separation units, for example, a separation unit including a cyclone or a filter, to treat a stripped fluid and return any polymer flakes that may have escaped with departing stripped fluid back to the purge system 104. For example, a separation unit 144 may be coupled to the stripped fluid outlet 140 of the purge column 108. Likewise, a separation unit 146 may be coupled to the stripped fluid outlet 122 of the fluidized bed separator 108. Separated polymer flakes from these adjunct separation units may be returned to one or both of the purge column 106 or the fluidized bed separator 108.

One or more motive units may be used to drive flow in one more lines or portions of the polymerization system 100 or the purge system 104. For example, the purge system 104 may include a motive device 148 (for example, a compressor, blower, or fan) to sustain a recycled stream of stripping fluid through the fluidized bed separator 108.

In some aspects, the purge system 104 further includes a scavenging unit 142 including a poison scavenger composition for treating stripping fluid introduced in the fluidized bed separator 108. The poison scavenger composition may include at least one component that neutralizes or mitigates catalyst poisons that may be present in the stripping fluid.

While not shown in FIG. 3, the polymerization system 100 may also include a controller, one or more sensors, and one or more control elements, similar to those described with reference to the polymerization system 10.

Thus, the purge system 104 may be used to strip heavy hydrocarbons from the reactor product from the reactor 102, while reducing, minimizing, or substantially preventing loss of stripping fluid or stripping light olefin. In aspects, the purge system 104 may be operated using techniques described with reference to FIG. 4. However, any suitable technique according to the present disclosure may be used to operate the purge system 104.

Figure 4:
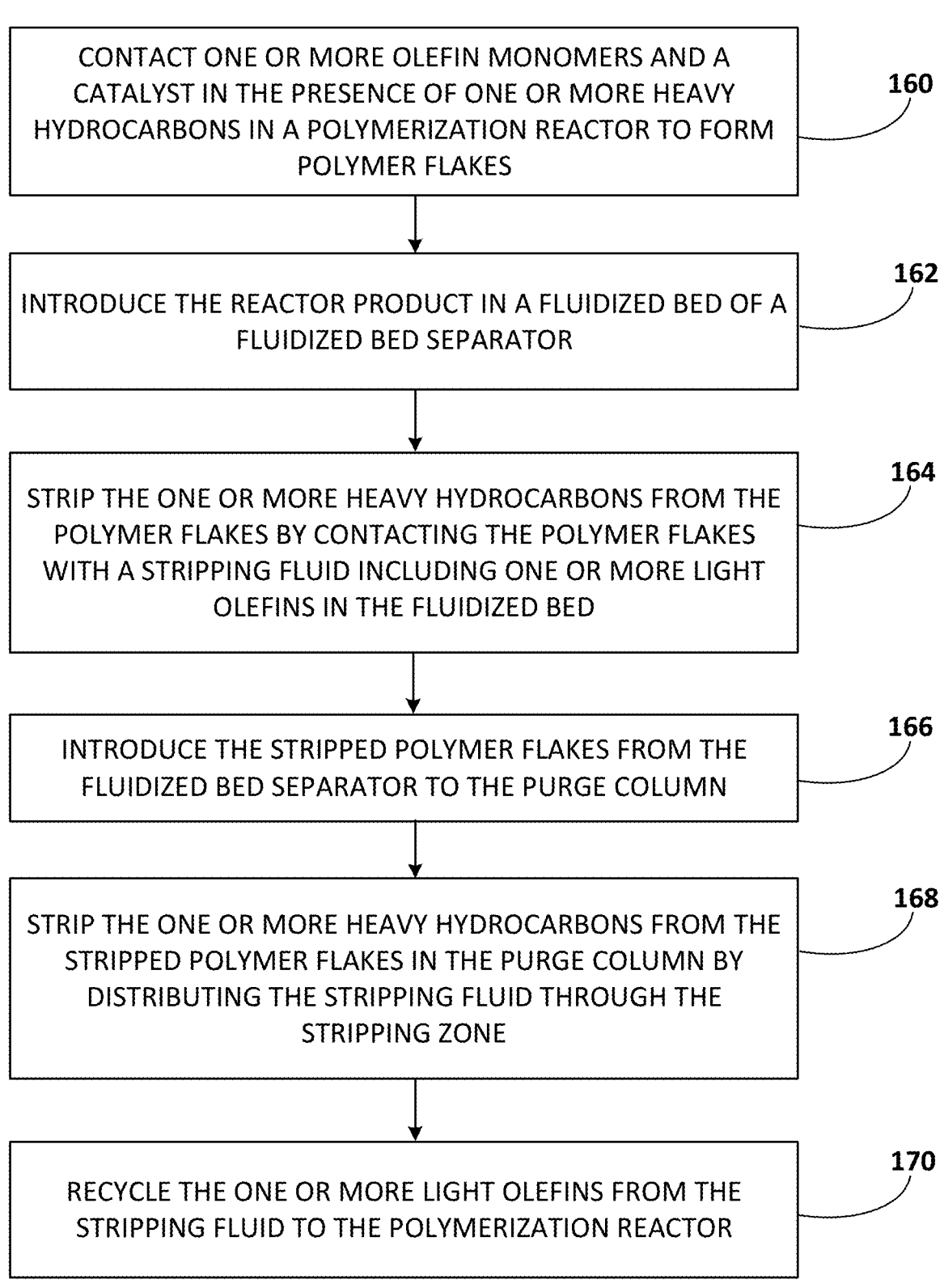
FIG. 4 is a flow diagram showing a technique for operating a polymerization system including a polymerization reactor fluidically coupled to a purge system including a purge column and a fluidized bed separator.

FIG. 4 is a flow diagram showing a technique for operating the polymerization system 100 including the polymerization reactor 102 fluidically coupled to the purge system 104 including a purge column 106 and a fluidized bed separator 108. The technique of FIG. 4 is described with reference to the polymerization system 100 of FIG. 3 as an example, and can be alternatively practiced with another suitable system according to the present disclosure. At step 160, the technique includes contacting one or more olefin monomers and a catalyst in the presence of one or more heavy hydrocarbons in the polymerization reactor 102 to form a reactor product including polymer flakes and residual heavy hydrocarbons. The one or more heavy hydrocarbons may include one or more of 1-butene, 1-hexene, 1-octene, 1-decene, butanes, or pentanes. The catalyst may include a Ziegler-Natta catalyst, a chromium based catalyst, or a metallocene catalyst.

At step 162, the technique includes introducing the reactor product in the fluidized bed 114 of the fluidized bed separator 108. At step 164, the technique includes stripping the one or more heavy hydrocarbons from the polymer flakes of the reactor product by contacting the polymer flakes with a stripping fluid including one or more light olefins in the fluidized bed 114 of the fluidized bed separator 108 to provide stripped polymer flakes. In some aspects, the one or more olefin monomers include the one or more light olefins. For example, the light olefins may be suitable for use as monomers in the polymerization reactor 102, and after use in stripping the polymer flakes, may be transported to the polymerization reactor 102.

At step 166, the technique includes introducing the stripped polymer flakes from the fluidized bed separator 108 to the purge column 106. At step 168, the technique includes stripping the one or more heavy hydrocarbons from the stripped polymer flakes of the reactor product in the purge column 106 by distributing the second stripping fluid through the stripping zone 128 of the purge column 106. The second stripping fluid may include one or more light olefins. The second stripping fluid may be different than a stripping fluid used in the fluid bed.

In some aspects, the one or more olefin monomers consist of or consist essentially of the one or more light olefins. For example, the same olefin(s) useful as stripping fluid may be useful in preparing the polymer product. In some aspects, the one or more light olefins are identical to the one or more olefin monomers. In some aspects, the one or more olefin monomers and the one or more light olefins consist of or consist essentially of ethylene. In some aspects, the stripping fluid consists of or consists essentially of ethylene. In some aspects, the ethylene is not pre-treated for catalyst poisons, and wherein catalyst poisons present in the ethylene are at least partially deactivated by contact with residual catalyst present in the polymer flakes in the purge system 104. If poison treater beds are not used, the addition of a small poison scavenger (such as an diluted aluminum alkyl or aluminum alkyl supported on a solid) could be provided to a fluidizing gas fed to the fluidized bed 114 as required to control residual activity.

Using a combination of a fluidized bed or a plug flow bed with a purge column may allow any residual catalytic activity in the polymer to be sufficiently dispersed in treating catalyst poisons that may be present in the stripping fluid. The use of a fluidized bed could also allow flakes that have been discharged from the polymerization reactor 102 to be re-heated to higher temperatures to improve downstream stripping. For example, flake temperatures may decline upon withdrawal and depressurizing from the polymerization reactor 102 and devolatilizing the hydrocarbons that were absorbed into the flakes in the polymerization reactor 102. In aspects, the flakes can be heated or cooled to substantially match the reactor temperature, or reach 10° F. above the reactor temperature in the fluid bed separator.

In aspects, the technique optionally includes step 170 of further recycling the one or more olefin monomers from the stripping fluid in one or both of the fluidized bed 114 of the fluidized bed separator 108 or the stripping zone 128 of the purge column 106 to the polymerization reactor 102 using an appropriate motive device 129 (for example, a compressor). Thus, the technique according to FIG. 4 may be used to reduce or minimize heavy hydrocarbons in the polymer flake, while also reducing or minimizing stripping fluid loss.

In aspects, the stripped polymer flakes in the stripped flake outlet 134 of the purge column 106 include less than 25 ppm of the heavy hydrocarbons.

Combining the fluidized bed separator 108 with the purge column 106 may provide further advantages. For example, the fluid bed 114 could provide an initial flash to make a preliminary separation of gas and flakes from the polymerization reactor 102 as well as heat the flakes, and to provide an elevation increase to reach the top of the purge column 106. For example, in gas-phase polyolefin processes, the bottom of the polymerization reactor 102 may not be significantly elevated, and otherwise may require additional equipment to transport the flakes from the outlet at or adjacent the bottom of the polymerization reactor 102 to top of the purge column 106. Further, the fluidized bed separator could be designed to accept the full olefin (for example, ethylene) flow required to support the production rate (if desired) and provide heat input to the flakes as the initial flash is made. For example, the fluidized bed 114 may be used in place of flash gas lines or fluff flash gas lines for loop slurry processes. In this way, the temperatures can be returned to reactor polymerization temperatures in the fluidized bed separator 108, for example, counteracting a temperature drop that may occur during the initial flash and stripping. The fluidized bed 114 may also be operated at a higher pressure than the purge column 106, or at nearly the same pressure.

The invention is described above with reference to numerous aspects and embodiments, and specific examples. Many variations will suggest themselves to those skilled in the art in light of the above detailed description. All such obvious variations are within the full intended scope of the appended claims. Other aspects of the invention can include, but are not limited to, the following aspects. Many aspects are described as "including" certain components or steps, but alternatively, can "consist essentially of" or "consist of" those components or steps unless specifically stated otherwise.

ASPECTS

Aspect 1. A purge system for a polymerization system, the purge system including:
  a purge column including a flake inlet for introducing a reactor product stream including polymer flakes and one or more heavy hydrocarbons in a stripping zone of the purge column;
  a stripping fluid distributor in the purge column below the stripping zone for injecting a stripping fluid including one or more light olefins into the stripping zone and adapted to provide stripped polymer flakes;
  a first displacement zone below the distributor and configured to at least partially displace a first portion of residual stripping fluid from the stripped polymer flakes received from the stripping zone;
  a second displacement zone below the first displacement zone configured to substantially displace a second portion of residual stripping fluid from the stripped polymer flakes received from the first displacement zone;
  a nitrogen distributor for introducing nitrogen in the second displacement zone;
  a stripped flake outlet; and
  a stripping fluid outlet.
Aspect 2. The purge system of aspect 1, wherein the nitrogen distributor is a first nitrogen distributor, the purge system further including:

a third displacement zone below the second displacement zone to substantially displace residual stripping fluid from the stripped polymer flakes received from the second displacement zone; and
  a second nitrogen distributor for introducing nitrogen in the third displacement zone.
Aspect 3. The purge system of aspect 2, wherein the first displacement zone, the second displacement zone, and the third displacement zone are defined in a single displacement unit coupled to a bottom of the purge column.
Aspect 4. The purge system of aspect 2, wherein the first displacement zone, the second displacement zone, and the third displacement zone are defined in separate units.
Aspect 5. The purge system of any of aspects 1 to 4, further including a take-off valve coupled to the stripped flake outlet for extracting stripped polymer flakes from the purge column.
Aspect 6. The purge system of any of aspects 1 to 5, further including a first displacement outlet coupled to the first displacement zone and a second displacement outlet coupled to the second displacement zone for expelling displaced fluid from the first displacement zone and the second displacement zone.
Aspect 7. The purge system of any of aspects 1 to 6, further comprising one or more of an olefin sensor, a nitrogen sensor, a flow sensor, or a pressure sensor at one or more predetermined locations of the purge system.
Aspect 8. The purge system of any of aspects 1 to 7, further including a hydrocarbon destruction device configured to eliminate hydrocarbons in fluid displaced from the first displacement zone or the second displacement zone.
Aspect 9. The purge system of any of aspects 1 to 8, wherein the flake inlet is at or adjacent a top of the purge column.
Aspect 10. The purge system of any of aspects 1 to 9, wherein the stripping fluid distributor is at or adjacent a bottom of the purge column.
Aspect 11. A polymerization system including:
  a polymerization reactor; and
  the purge system of any of aspects 1 to 10 coupled to the polymerization reactor.
Aspect 12. The polymerization system of aspect 11, wherein the polymerization reactor is a gas phase reactor.
Aspect 13. The polymerization system of aspect 12, wherein the polymerization reactor is a fluidized bed gas phase reactor.
Aspect 14. The polymerization system of aspect 11, wherein the polymerization reactor is a liquid phase reactor.
Aspect 15. The polymerization system of aspect 11, wherein the polymerization reactor is a loop slurry reactor.
Aspect 16. A technique of operating a polymerization system including a polymerization reactor coupled to the purge system of any of aspects 1 to 10, the technique including:
  contacting one or more olefin monomers and a catalyst in the presence of one or more heavy hydrocarbons in a polymerization reactor to form a reactor product including polymer flakes and residual heavy hydrocarbons;
  introducing the reactor product in the stripping zone of the purge system;
  stripping the one or more heavy hydrocarbons from the polymer flakes of the reactor product in the purge system by distributing a stripping fluid including one or more light olefins through the stripping zone to provide stripped polymer flakes; and displacing residual stripping fluid from the stripped polymer flakes by introducing nitrogen in the first displacement zone and the second displacement zone.

Aspect 17. The technique of aspect 16, wherein the displacing residual stripping fluid from the stripped polymer flakes includes introducing nitrogen in the first nitrogen inlet in the second displacement zone.

Aspect 18. The technique of aspects 16 or 17, further including introducing nitrogen in the third displacement zone.

Aspect 19. The technique of aspect 18, wherein the displacing residual stripping fluid from the stripped polymer flakes includes introducing nitrogen in the second nitrogen inlet in the third displacement zone.

Aspect 20. The technique of any of aspects 16 to 19, wherein the one or more olefin monomers include the one or more light olefins.

Aspect 21. The technique of aspect 20, wherein the one or more olefin monomers consist of or consist essentially of the one or more light olefins.

Aspect 22. The technique of any of aspects 16 to 21, further including recycling the one or more olefin monomers from the stripping fluid in the stripping zone to the polymerization reactor.

Aspect 23. The technique of any of aspects 16 to 22, further including expelling the one or more heavy hydrocarbons from the stripping fluid in the first displacement zone and the second displacement zone from the polymerization system.

Aspect 24. The technique of any of aspects 16 to 23, wherein the stripping fluid consists of or consists essentially of ethylene.

Aspect 25. The technique of aspect 24, wherein the ethylene is not pre-treated for catalyst poisons, and wherein catalyst poisons present in the ethylene are at least partially deactivated by contact with residual catalyst present in the polymer flakes in the purge system.

Aspect 26. The technique of any of aspects 16 to 25, wherein the one or more heavy hydrocarbons include one or more of 1-butene, 1-hexene, 1-octene, 1-decene, butanes, or pentanes.

Aspect 27. The technique of any of aspects 16 to 26, wherein the catalyst includes a Ziegler-Natta catalyst, a chromium based catalyst, or a metallocene catalyst.

Aspect 28. The technique of any of aspects 17 to 27, wherein the stripped polymer flakes in the first displacement zone include less than 25 ppmw of the heavy hydrocarbons.

Aspect 29. The technique of any of aspects 17 to 28, wherein the stripped polymer flakes in one or more of the first displacement zone, the second displacement zone, or the third displacement zone include less than 5 ppmw of the stripping fluid.

Aspect 30. The technique of any of aspects 19 to 29, wherein the stripped polymer flakes in the third displacement zone include less than 2 ppmw of the stripping fluid.

Aspect 31. A purge system for a polymerization system, the purge system including:
   a fluidized bed separator including:
      a separator inlet for introducing a reactor product stream including polymer flakes and one or more heavy hydrocarbons into a fluidized bed,
      a stripping fluid inlet for introducing a first stripping fluid in the fluidized bed,
      a first stripped fluid outlet for a first stripped fluid from the fluidized bed,
      a separator outlet for discharging stripped polymer flakes; and a purge column including:
      a flake inlet for receiving the stripped polymer flakes from the fluidized bed separator into a stripping zone of the purge column,
      a stripping fluid distributor below the stripping zone for injecting a second stripping fluid including one or more light olefins into the stripping zone,
      a stripped flake outlet, and
      a second stripped fluid outlet for a second stripped fluid from the purge column.

Aspect 32. The purge system of aspect 31, further including a take-off valve coupled to the stripped flake outlet for extracting stripped polymer flakes from the purge column.

Aspect 33. The purge system of aspects 31 or 32, wherein the flake inlet is adjacent a top of the purge column.

Aspect 34. The purge system of any of aspects 31 to 33, wherein the separator outlet of the fluidized bed separator is above a top or above the flake inlet of the purge column.

Aspect 35. The purge system of any of aspects 31 to 34, wherein the separator outlet is above the separator inlet of the fluidized bed separator.

Aspect 36. The purge system of any of aspects 31 to 35, wherein the stripping fluid distributor is adjacent a bottom of the purge column.

Aspect 37. The purge system of any of aspects 31 to 36, further including a heater for heating stripping fluid introduced in the fluidized bed separator.

Aspect 38. The purge system of aspect 37, wherein the heater is configured to return a flake temperature leaving the fluidized bed separator to within 10° F. of a polymerization temperature of the polymerization reactor.

Aspect 39. The purge system of any of aspects 31 to 38, wherein the purge column of aspect 1 further includes:
   a first displacement zone below the distributor and configured to at least partially displace a first portion of residual stripping fluid from the stripped polymer flakes received from the stripping zone;
   a second displacement zone below the first displacement zone configured to substantially displace a second portion of residual stripping fluid from the stripped polymer flakes received from the first displacement zone; and
   a third displacement zone below the second displacement zone to substantially displace residual stripping fluid from the stripped polymer flakes received from the second displacement zone.

Aspect 40. The purge system of any of aspects 31 to 39, further including a scavenging unit including a poison scavenger composition for treating stripping fluid introduced in the fluidized bed separator.

Aspect 41. A polymerization system including:
   a polymerization reactor; and
   the purge system of any of aspects 31 to 40 coupled to the polymerization reactor.

Aspect 42. The polymerization system of aspect 41, further including a recycle line for recycling stripped fluid from the purge system to the polymerization reactor.

Aspect 43. A technique of operating a polymerization system including a polymerization reactor coupled to the purge system of any of aspects 31 to 42, the technique including:
   contacting one or more olefin monomers and a catalyst in the presence of one or more heavy hydrocarbons in the polymerization reactor to form a reactor product including polymer flakes and residual heavy hydrocarbons;

introducing the reactor product in the fluidized bed of the fluidized bed separator;

stripping the one or more heavy hydrocarbons from the polymer flakes of the reactor product by contacting the polymer flakes with a stripping fluid including one or more light olefins in the fluidized bed of the fluidized bed separator to provide stripped polymer flakes;

introducing the stripped polymer flakes from the fluidized bed separator to the purge column; and stripping the one or more heavy hydrocarbons from the stripped polymer flakes of the reactor product in the purge column by distributing the stripping fluid through the stripping zone.

Aspect 44. The technique of aspect 43, wherein the one or more olefin monomers include the one or more light olefins.

Aspect 45. The technique of aspect 44, wherein the one or more olefin monomers consist of or consist essentially of the one or more light olefins.

Aspect 46. The technique of any of aspects 43 to 45, further including recycling the one or more light olefins from the stripping fluid in one or both of the fluidized bed of the fluidized bed separator or the stripping zone of the purge column to the polymerization reactor.

Aspect 47. The technique of any of aspects 43 to 46, wherein the stripping fluid consists of or consists essentially of ethylene.

Aspect 48. The technique of aspect 47, wherein the ethylene is not pre-treated for catalyst poisons, and wherein catalyst poisons present in the ethylene are at least partially deactivated by contact with residual catalyst present in the polymer flakes in the purge system.

Aspect 49. The technique of any of aspects 43 to 48, wherein the one or more heavy hydrocarbons include one or more of 1-butene, 1-hexene, 1-octene, 1-decene, butanes, or pentanes.

Aspect 50. The technique of any of aspects 43 to 49, wherein the catalyst includes a Ziegler-Natta catalyst, a chromium based catalyst, or a metallocene catalyst.

Aspect 51. The technique of any of aspects 43 to 50 wherein the stripped polymer flakes in the stripped flake outlet of the purge column include less than 25 ppmw of the heavy hydrocarbons.

We claim:

1. A purge system comprising:
a purge column, the purge column comprising:
   a flake inlet for introducing a reactor product stream comprising polymer flakes and one or more heavy hydrocarbons;
   a stripping zone, the stripping zone comprising a stripping fluid distributor for injecting a stripping fluid comprising one or more light olefins into the stripping zone and adapted to provide stripped polymer flakes;
   a stripping fluid outlet for releasing used stripping fluid from the purge column; and
   a conical bottom portion below the stripping fluid distributor;
a displacement unit below the purge column and partially overlapping the conical bottom portion of the purge column, the displacement unit configured to receive stripped polymer flakes from the stripping zone, and further configured to displace at least a portion of residual stripping fluid from the stripped polymer flakes by introducing nitrogen, wherein the displacement unit comprises a first displacement outlet disposed at an upper portion of the displacement unit such that the first displacement outlet is higher than a lower edge of the conical bottom portion of the purge column, the first displacement outlet configured to expel displaced fluid from the displacement unit; and
a stripped flake outlet.

2. The purge system of claim 1, wherein the conical bottom portion of the purge column is configured as a displacement zone configured to receive stripped polymer flakes from the stripping zone and to displace at least a portion of residual stripping fluid from the stripped polymer flakes.

3. The purge system of claim 1, wherein the displacement unit comprises a first displacement zone proximal to the conical portion of the purge column, and a second displacement zone below the first displacement zone.

4. The purge system of claim 3, further comprising a second displacement outlet coupled to the second displacement zone for expelling displaced fluid from the first displacement zone and the second displacement zone.

5. The purge system of claim 4, wherein:
the first displacement zone has a conical lower portion,
the second displacement zone partially overlaps the conical lower portion of the first displacement zone, and
the second displacement outlet is disposed at a position higher than a lower edge of the conical lower portion of the first displacement zone.

6. The purge system of claim 1, further comprising one or more of an olefin sensor, a nitrogen sensor, a flow sensor, or a pressure sensor at one or more predetermined locations of the purge system.

7. The purge system of claim 1, wherein the flake inlet is at or adjacent a top of the purge column.

8. The purge system of claim 1, wherein the stripping fluid distributor is at or adjacent a bottom of the purge column.

9. A polymerization system comprising:
a polymerization reactor; and
the purge system of claim 1 coupled to the polymerization reactor.

10. The polymerization system of claim 9, wherein the polymerization reactor is a fluidized bed gas phase reactor, a liquid phase reactor, or a loop slurry reactor.

11. A method of operating a polymerization system comprising a polymerization reactor coupled to the purge system of claim 1, the method comprising:
contacting one or more olefin monomers and a catalyst in the presence of one or more heavy hydrocarbons in a polymerization reactor to form a reactor product comprising polymer flakes and residual heavy hydrocarbons;
introducing the reactor product in the stripping zone of the purge system;
stripping the one or more heavy hydrocarbons from the polymer flakes of the reactor product in the purge system by distributing a stripping fluid comprising one or more light olefins through the stripping zone to provide stripped polymer flakes; and
displacing residual stripping fluid from the stripped polymer flakes by introducing nitrogen in the displacement unit.

12. The method of claim 11, wherein the one or more olefin monomers comprise the one or more light olefins.

13. The method of claim 12, wherein the one or more olefin monomers consist of or consist essentially of the one or more light olefins.

14. The method of claim 11, further comprising recycling the one or more olefin monomers from the stripping fluid in the stripping zone to the polymerization reactor.

15. The method of claim 11, wherein the stripping fluid consists of or consists essentially of ethylene.

16. The method of claim 15, wherein the ethylene is not pre-treated for catalyst poisons, and wherein catalyst poisons present in the ethylene are at least partially deactivated by contact with residual catalyst present in the polymer flakes in the purge system.

17. The method of claim 11, wherein the one or more heavy hydrocarbons comprise one or more of 1-butene, 1-hexene, 1-octene, 1-decene, butanes, or pentanes.

18. The method of claim 11, wherein the stripped polymer flakes in the displacement unit comprise less than 25 ppmw of the heavy hydrocarbons.

19. The method of claim 11, wherein the displacement unit comprises a first displacement zone, a second displacement zone below the first displacement zone, and a third displacement zone below the second displacement zone, wherein the stripped polymer flakes in one or more of the
      first displacement zone, the second displacement zone,
      or the third displacement zone comprise less than 5
      ppmw of the stripping fluid.

20. The method of claim 19, wherein the stripped polymer flakes in the third displacement zone comprise less than 2 ppmw of the stripping fluid.

\*     \*     \*     \*     \*